United States Patent
Lee et al.

(10) Patent No.: US 7,508,615 B2
(45) Date of Patent: Mar. 24, 2009

(54) METHOD OF CONTROLLING MOVEMENT OF A TRANSDUCER AND DISK DRIVE USING SAME

(75) Inventors: Yeong-kyun Lee, Suwon-si (KR); Gyu-taek Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/704,288

(22) Filed: Feb. 9, 2007

(65) Prior Publication Data
US 2007/0188912 A1 Aug. 16, 2007

(30) Foreign Application Priority Data
Feb. 10, 2006 (KR) .................. 10-2006-0012878

(51) Int. Cl.
*G11B 21/02* (2006.01)
*G11B 5/596* (2006.01)

(52) U.S. Cl. ........................ 360/75; 360/78.04
(58) Field of Classification Search .............. None
See application file for complete search history.

(56) References Cited

U.S. PATENT DOCUMENTS

| 6,900,957 | B2 * | 5/2005 | Gillis et al. ............ 360/69 |
| 7,271,976 | B2 * | 9/2007 | Ishii et al. ............. 360/75 |
| 2002/0135922 | A1 * | 9/2002 | Smith ..................... 360/69 |
| 2002/0186492 | A1 * | 12/2002 | Smith ..................... 360/69 |
| 2003/0086200 | A1 * | 5/2003 | Tokizono et al. ......... 360/78.06 |
| 2003/0123171 | A1 * | 7/2003 | Snith et al. ............. 360/31 |

FOREIGN PATENT DOCUMENTS

| JP | 07-176154 | 7/1995 |
| JP | 09-044986 | 2/1997 |
| JP | 11-317036 | 11/1999 |
| KR | 1019920006297 B1 | 8/1992 |

* cited by examiner

*Primary Examiner*—Andrew L Sniezek
(74) *Attorney, Agent, or Firm*—Volentine & Whitt, PLLC (57) ABSTRACT

A method and apparatus for controlling movement of a transducer to limit its stopping time at a certain position of a disk regardless of whether the disk drive performs a read/write operation, an etching or clustering effect of a lube layer coated on the disk is prevented, thereby preventing performance degradation of the disk drive. The method including (a) determining whether the transducer is located in a data zone of a disk at a predetermined period of time; (b) if the transducer is located in the data zone of the disk based on the result of step (a), determining whether a command accompanied by a disk access is executed; and (c) if the command accompanied by a disk access is executed based on the result of operation (b), waiting until the execution of the command accompanied by the disk access is finished and moving the transducer to a new track determined according to a predetermined algorithm, and if the command accompanied by a disk access is not executed based on the result of operation (b), immediately moving the transducer to a new track determined according to the predetermined algorithm.

15 Claims, 6 Drawing Sheets

METHOD OF CONTROLLING MOVEMENT OF A TRANSDUCER AND DISK DRIVE USING SAME

BACKGROUND OF THE INVENTION

1. Field of the Invention

The present invention relates to a method and apparatus for controlling a disk drive, and more particularly, to a method and apparatus for controlling the movement of a transducer in a disk drive to optimize a lube layer coated on a disk.

This application claims the benefit of Korean Patent Application No. 10-2006-0012878, filed on Feb. 10, 2006, in the Korean Intellectual Property Office, the disclosure of which is incorporated herein in its entirety by reference.

2. Discussion of Related Art

A hard disk drive (HDD) reproduces data recorded on a disk or records data on the disk using a transducer (a head). Bits per inch (BPI) is the write density of a disk in the rotational direction. Tracks per inch (TPI) is the write density of a disk in a radius direction. As BPI and TPI have increased, small-sized and high storage capacity HDDs are manufactured and a more accurate positional mechanism is required.

To prevent damage due to friction between the disk and the head of the HDD, a lube layer is coated on the disk. However, when the disk rotates at high speed while the head is located above the lube layer on the disk, the lube coated on the disk is moved aside due to air pressure and friction generated between the head and the disk due to the up and down floating motion of the head. Since movement of the lube on the disk is small this does not evolve into a serious problem. However, if the head stays in a specific position above the disk without moving for a significant length of time, or if the head moves a short distance for a relatively long time, the lube which is moved aside increases. Accordingly, the thickness of the lube at and around the head position becomes gradually thinner which obstructs the movement of the head, thereby leading to possible damage of the head and/or the disk.

A technique for solving this problem is disclosed in commonly assigned Korean Patent Application No. 1990-12208 entitled "Method of Controlling Actuator in HDD," ("the '208 Application"). The '208 Application discloses a technique of moving a disk head by driving an actuator after a predetermined period of time if an HDD is not accessed within the predetermined time. This approach prevents possible damage due to friction between the head and the disk by periodically moving the head only in an idle state in which a read/write command is not received from a host device for a predetermined time. However, if the host device transmits consecutive read/write commands for reading/writing data at the same position on the disk, the conventional approach cannot prevent damages due to friction between the head and the disk because of the accumulated lube in that disk location. In addition, if a pattern of host commands, such as a sequential read/write command, requires the head to be moved bit-by-bit in one direction, the head moves and accumulates the lube in one direction, ultimately affecting a track following operation of the head.

SUMMARY OF THE INVENTION

The present invention provides a method of controlling the movement of a transducer to limit a stopping time of the transducer at a certain position regardless of a read/write operation and a disk drive using the same. A disk drive comprises a timer for measuring a period of time, a disk having a data zone for storing information; and a transducer configured to move across the surface of said disk to write or read information to or from the disk. A voice coil motor (VCM) moves the transducer and a controller detects the position of the transducer at a predetermined period of time based on the time measured by said timer, said controller controlling said VCM to seek a track determined according to a predetermined algorithm if the transducer is located in the data zone of the disk. A method is also provided which includes (a) determining whether the transducer is located in a data zone of the disk at a predetermined period of time. If the transducer is located in the data zone of the disk based on step (a), determining whether a command accompanied by a disk access is executed. if the command accompanied by a disk access is executed as determined at step (b), waiting until the execution of the command accompanied by a disk access is finished and moving the transducer to a new track determined according to a predetermined algorithm, if the command accompanied by a disk access is not executed as determined at step (b), immediately moving the transducer to a new track determined according to the predetermined algorithm.

DESCRIPTION OF EMBODIMENTS

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Figure 1:
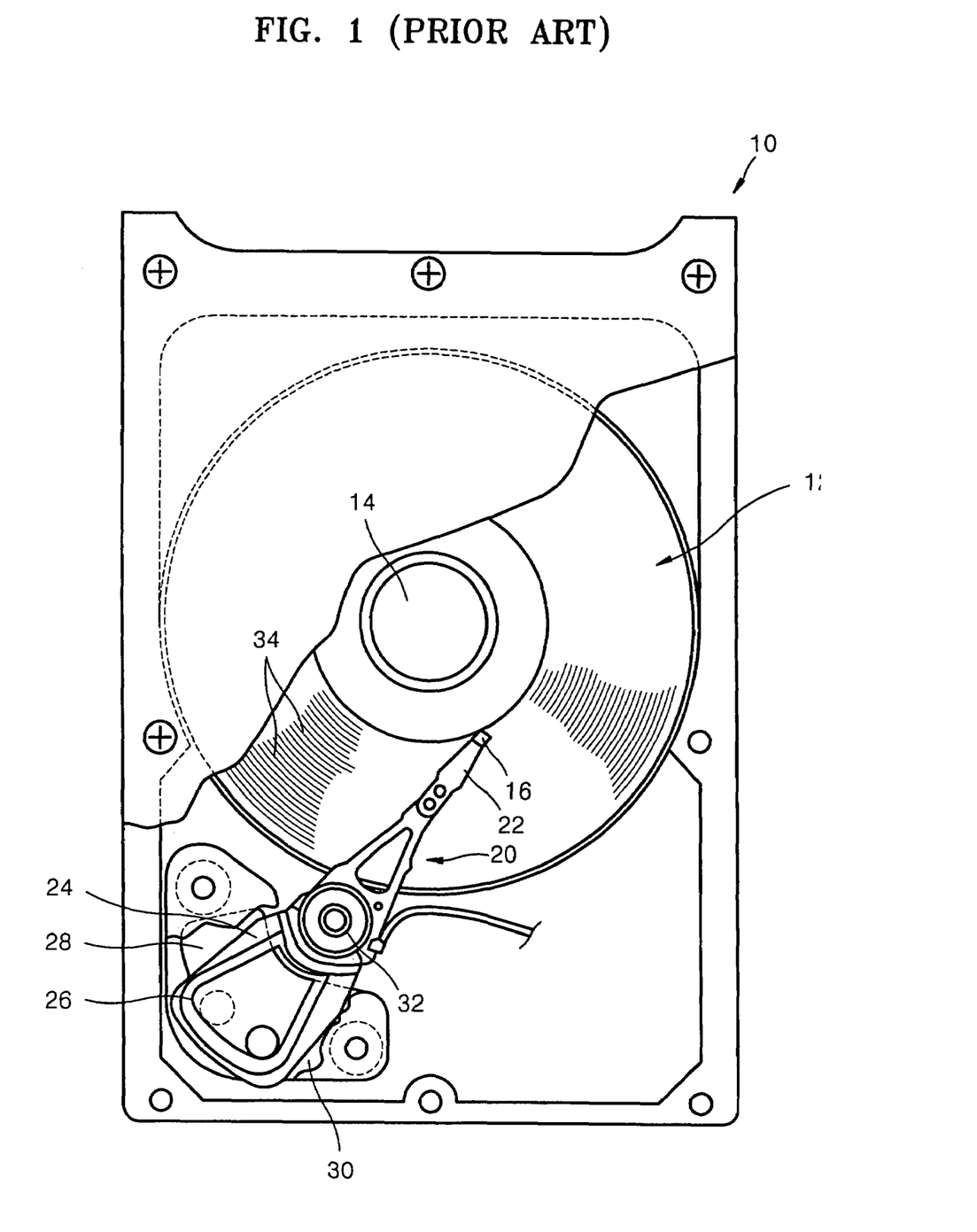
FIG. 1 is a schematic plan view of a head disk assembly (HDA) of an HDD to which the present invention is applied.

FIG. 1 is a schematic plan view of a Head Disk Assembly (HDA) 10 of an HDD which includes at least one magnetic disk 12 rotated by a spindle motor 14 and a head or transducer 16 located adjacent to the surface of disk 12. Transducer 16 can read information from disk 12 by sensing a magnetic field formed on the disk or writing information by magnetizing the disk. Transducer 16 may be mounted to face the surface of disk 12. Although a single transducer 16 is disclosed, transducer 16 includes a write transducer for magnetizing disk 12 and a separate read transducer for sensing a magnetic field of disk 12. The read transducer is composed of a magneto-resistive (MR) component. Transducer 16 may be mounted on a slider 20 which generates air between transducer 16 and the surface of disk 12. Slider 20 is combined with head gimbal assembly (HGA) 22 which is attached to an actuator arm 24 having a voice coil 26. Voice coil 26 is adjacent to a magnetic assembly 28 to define a voice coil motor (VCM) 30. Current supplied to voice coil 26 generates a torque to rotate actuator arm 24 around bearing assembly 32. The rotation of actuator arm 24 moves transducer 16 across the surface of disk 12. Disk 12 is divided into a data zone for storing data and a parking zone where transducer 16 is located when the HDD is not in use. Information is typically stored in concentric tracks where each track 34 includes a plurality of sectors and each sector includes a data field and an identification field. The data field stores data and the identification field is composed of gray code for identifying sectors and tracks (cylinders). Transducer 16 moves across the surface of disk 12 to read or write information from or to another track.

Figure 2:
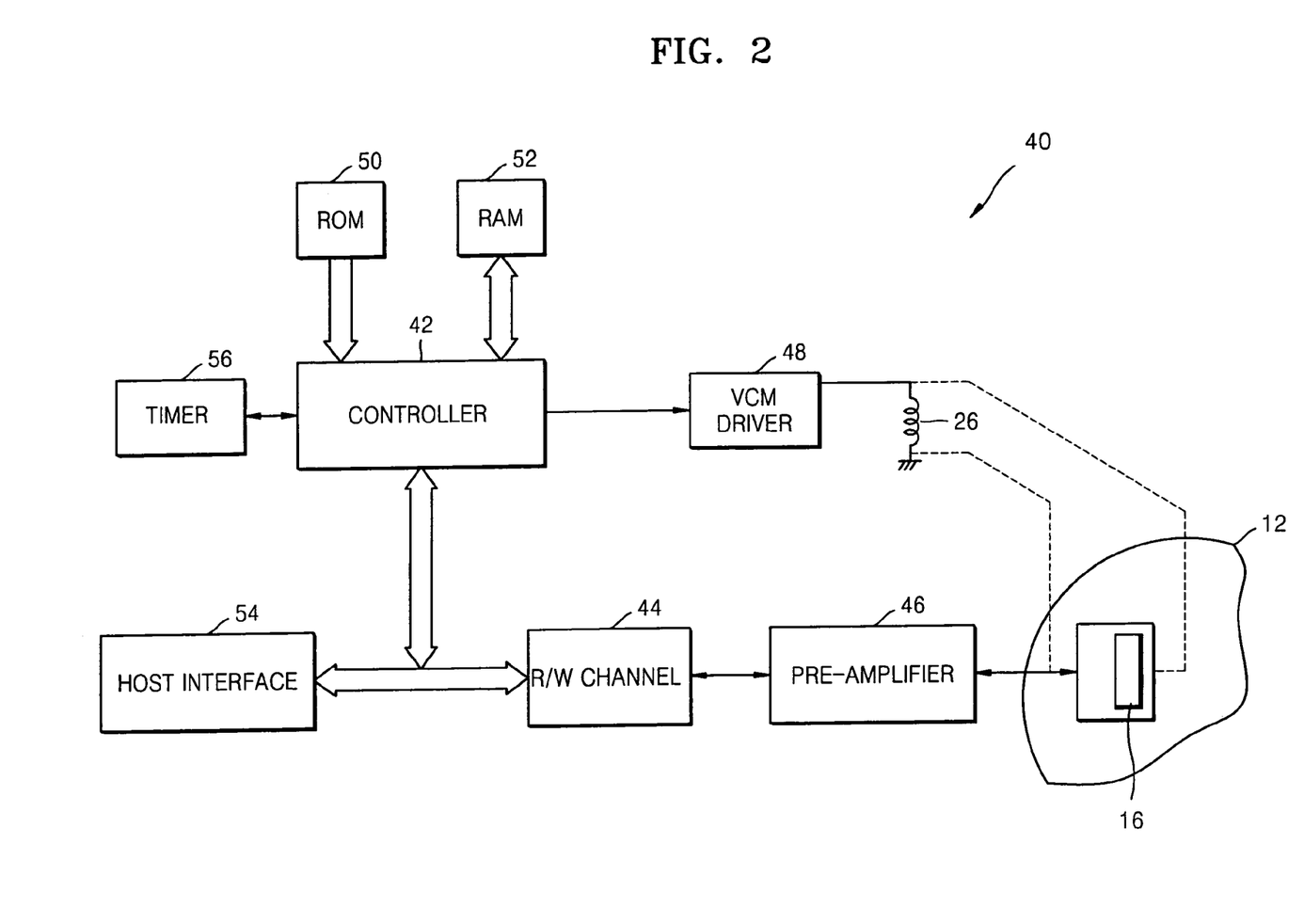
FIG. 2 is a block diagram of an electrical system of an HDD using a method of controlling the movement of a transducer according to an embodiment of the present invention.

FIG. 2 is a block diagram of an electrical system 40 of an HDD using a method of controlling the movement of a transducer. Electrical system 40 includes a controller 42 connected to transducer 16 through a read/write (R/W) channel circuit 44 and a pre-amplifier 46. Controller 42 may be, for example digital signal processor (DSP), a microprocessor, or microcontroller. Controller 42 controls the R/W channel circuit 44 to read or write data from or to disk 12 in response to a command received via host interface circuit 54 from a host device (not shown). Controller 42 is also connected to VCM driver 48 supplying a drive current to voice coil 26. The controller 42 provides a control signal to VCM driver 48 to control the movement of transducer 16. Controller 42 also communicates with ROM 50 and RAM 52. ROM 50 stores firmware and control information for controlling the HDD and the movement of transducer 16. RAM 52 stores disk drive information read from a maintenance cylinder of disk 12 when the HDD is turned on. Timer 56 measures time and generates time information by counting a clock signal generated by an internal oscillation component (not shown).

In a data read mode, the HDD amplifies an electrical signal sensed from disk 12 by transducer 16 in pre-amplifier 46 using a fixed gain. The R/W channel circuit 44 converts the signal read from disk 12 into a digital signal according to sector pulses generated by controller 42 and decodes the converted digital signal. The decoded data undergoes an error correction process by controller 42 using, for example, a Reed-Solomon code, and is converted to stream data and transmitted to a host device via host interface circuit 54. In a data write mode, the HDD receives data from the host device via host interface circuit 54. An error correction parity symbol pursuant to Reed-Solomon coding is added to the received data using controller 42 and encodes the parity symbol added data to fit a write channel using the R/W channel circuit 44. The encoded data is recorded on disk 12 through transducer 16 using a write current amplified by pre-amplifier 46.

Figure 4:
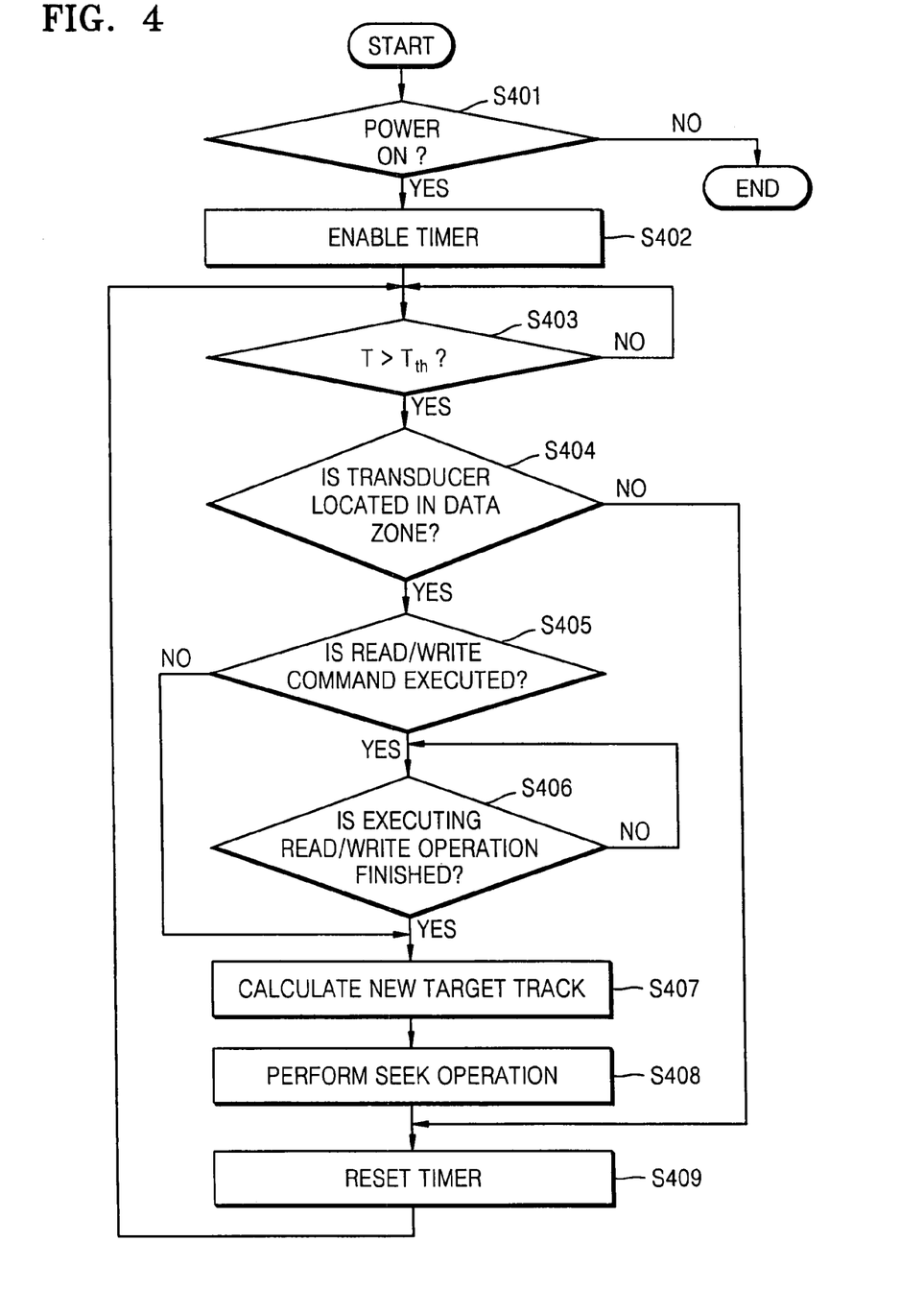
FIG. 4 is a flowchart illustrating a method of controlling the movement of a transducer according to an embodiment of the present invention.

Referring to FIG. 4, a method of controlling the movement of a transducer includes step S401 in which controller 42 determines whether the HDD has been changed into a power-on state. If HDD has been changed to the power-on state controller 42 enables timer 56 at step S402. When timer 56 is enabled, it generates time information by counting a clock signal. At step S403, controller 42 monitors the time information generated by timer 56 and determines whether a detected time T, according to the time information generated by timer 56, reaches a threshold time $T_{th}$. The threshold time $T_{th}$ is a factor for determining the length of a time required to execute a track seek routine separate from a data read/write operation. For example, the threshold time $T_{th}$ may be determined by the length of time required to execute a unit read/write command tens to hundreds of times considering data access performance of the HDD.

If it is determined in operation S403 that the detected time T according to the time information generated by the timer 56 reaches the threshold time $T_{th}$, in operation S404, the controller 42 determines whether the transducer 16 is located in the data zone of the disk 12. The controller 42 confirms a position of the transducer 16 by analyzing gray code read from the disk 12 by the transducer 16. That is, if gray code is not detected for a predetermined time, it is determined that the transducer 16 is located in the parking zone not the data zone.

At step S404 it is determined if transducer 16 is not located in the data zone of disk 12 and controller 42 resets timer 56 at step S409. If timer 56 is reset, the counting of the clock signal is measured again from the initial value. If at step S404 it is determined that transducer 16 is located in the data zone of disk 12, the controller 42 determines whether the HDD executes a command accompanied by a disk access at step S405. A command accompanied by a disk access may be for example a data read command and a data write command. If the HDD is in an idle state where a command accompanied by a disk access is not executed as determined at step S405, step S407 calculates a new target track using controller 42 to which transducer 16 is moved in order to prevent an etching or clustering effect of a lube layer coated on disk 12. For example, controller 42 may calculate a new target track using an algorithm to generate a random track number. Controller 42 may also calculate a new target track using an algorithm to increase or decrease a predetermined number of tracks from a previous track number. If a data read or write command accompanied by a disk access is executed based on result from step S405, controller 42 waits until the data read or write command is finished. At step S406, controller 42 determines whether a data read or write process according to the command accompanied by a disk access currently being executed, is finished. When the data read or write process from step S406 is finished controller 42 calculates a new target track to which the transducer 16 is moved in order to prevent an etching or clustering effect of the lube layer coated on the disk 12 at step S407. A new target track seek process is performed at step S408.

Figure 3:
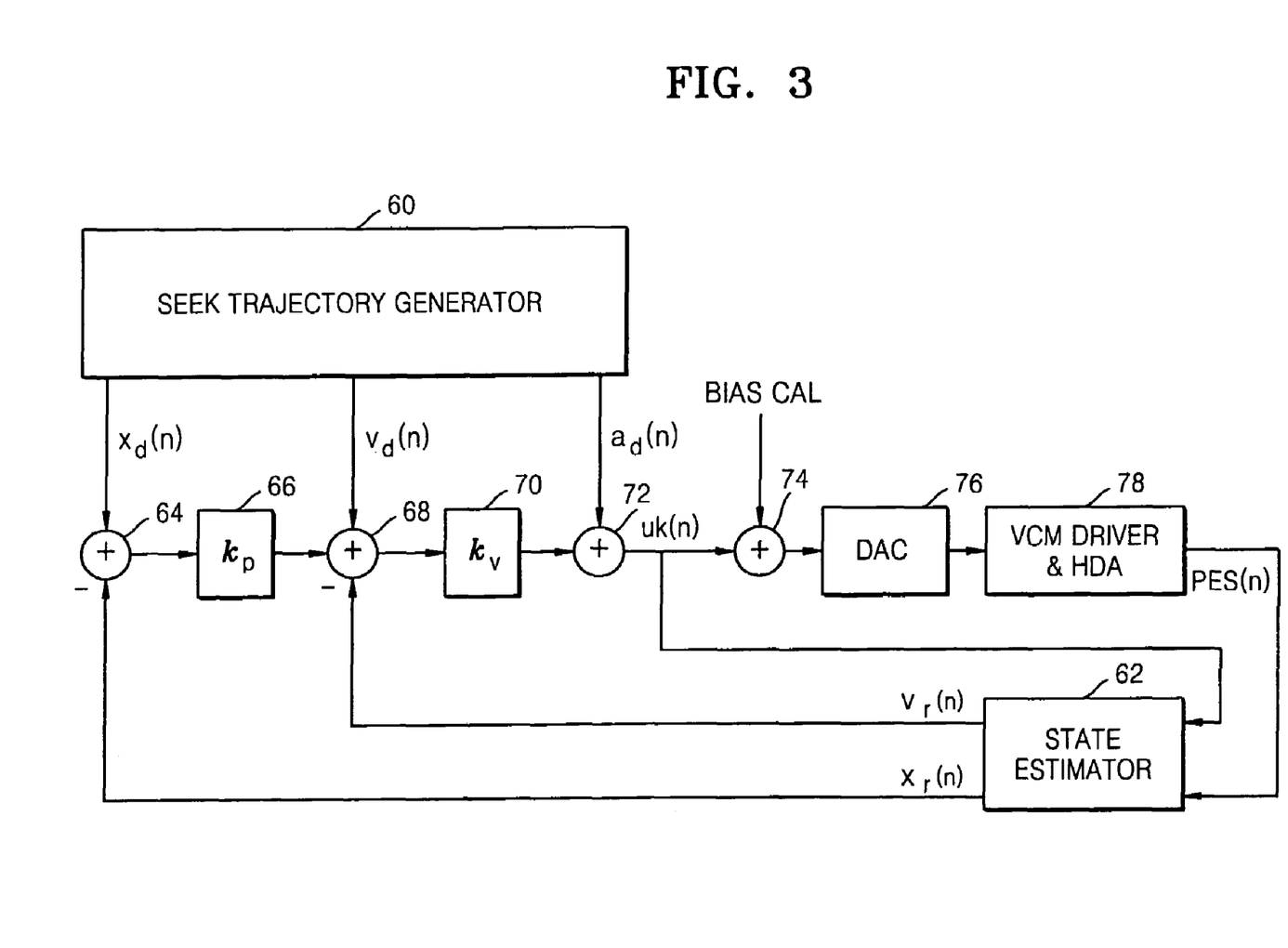
FIG. 3 is a block diagram of a servo control system of an HDD to which the present invention is applied.

Referring to FIG. 3, a seek trajectory generator 60 calculates a seek distance by calculating a difference between a number associated with a current track and a number associated with a new track to which transducer 16 is moved. An acceleration trajectory is generated based on the calculated seek distance, and generator 60 calculates a designed position value $x_d(n)$, a designed velocity value $v_d(n)$, and a designed acceleration value $a_d(n)$ of transducer 16 from velocity and position trajectories obtained by integrating the acceleration trajectory. A state estimator 62 performs a process of estimating state variables of the movement of transducer 16, which include a real position value $x_r(n)$ and a real velocity value $v_r(n)$ of transducer 16, from an input position error signal (PES) PES(n) and an input control signal uk(n) using a known state equation.

At a first summing junction 64, the real position value $x_r(n)$ is subtracted from the designed position value $x_d(n)$. A position control gain compensator 66 generates a position compensation value by multiplying the difference between the real position value $x_r(n)$ and the designed position value $x_d(n)$ by a position gain $k_p$ for position compensation. At a second summing junction 68, the real velocity value $v_r(n)$ is subtracted from a value obtained by adding the designed velocity value $v_d(n)$ to the position compensation value generated by the position control gain compensator 66. A velocity control gain compensator 70 generates a velocity compensation value by multiplying the value calculated at second summing junction 68 by a velocity gain $k_v$ for velocity compensation. At a third summing junction 72, a seek driving current value uk(n) is computed by adding the designed acceleration value $a_d(n)$ to the velocity compensation value.

A bias value bias_cal is added to the seek driving current value uk(n) at a fourth summing junction 74, converted to an analog signal by a digital-to-analog converter (DAC) 76, and input to a VCM driver and HDA 78. The VCM driver and HDA 78 supplies a seek driving current value determined according to a transducer position and operation temperature to voice coil 26. The transducer 16 is moved to the new target track generated in step S407 according to the above-described process. In this manner, the etching or clustering effect of the lube layer coated on disk 12 is prevented by recognizing a position of transducer 16 and periodically moving transducer 16 to a new track if transducer 16 is located in the data zone of disk 12.

Figure 5:
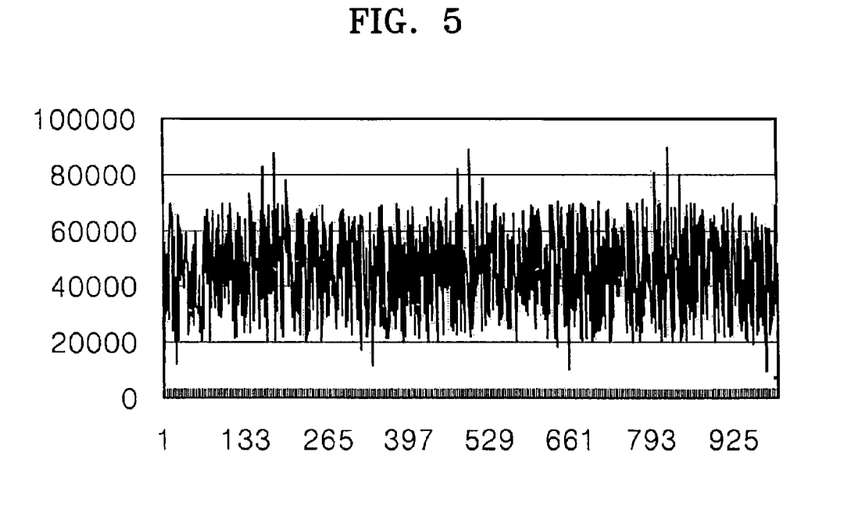
FIG. 5 is a diagram illustrating a moving trajectory of a transducer along time in a sequential read/write process of an HDD to which the present invention is applied.
Figure 6:
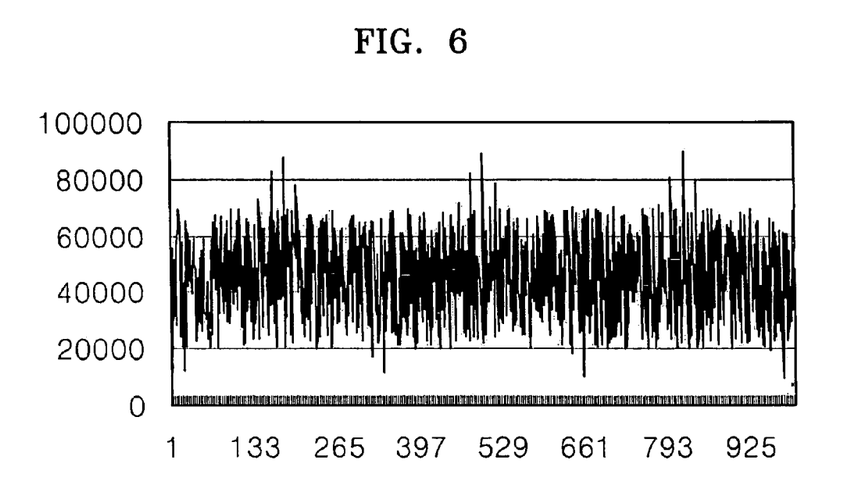
FIG. 6 is a diagram illustrating a moving trajectory of a transducer in a random read/write process of an HDD to which the present invention is applied.
Figure 7:
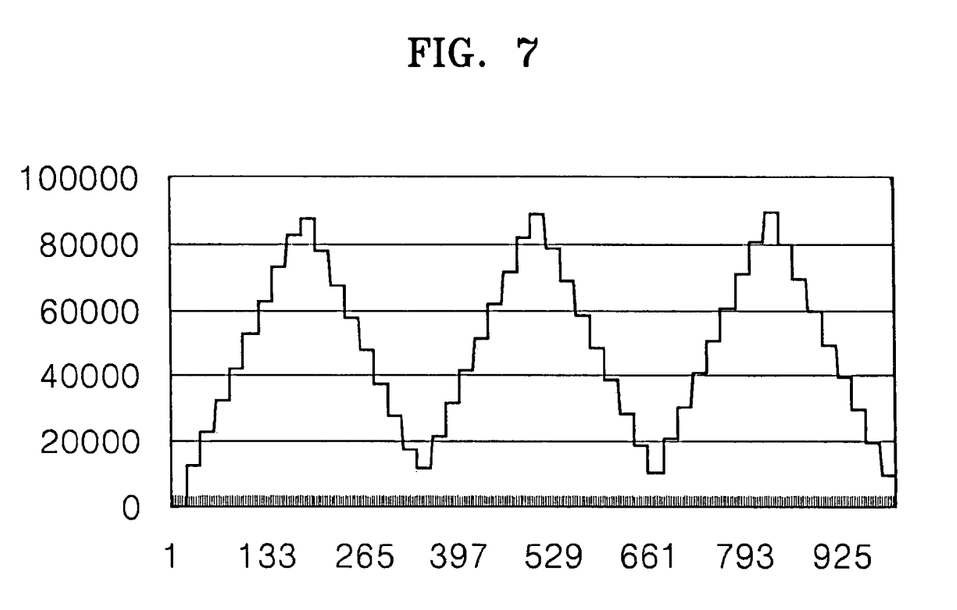
FIG. 7 is a diagram illustrating a moving trajectory of a transducer in an idle state of an HDD to which the present invention is applied.

FIGS. 5 through 7 illustrate moving trajectories of transducer 16 on disk 12 when transducer 16 is moved to a new target track by generating a new target track number using a method of increasing or decreasing a predetermined number of tracks from a previous seek track number. The horizontal axis in FIGS. 5-7 denote time in seconds and the vertical axis denotes a track number of disk 12. In particular, FIG. 5 illustrates a moving trajectory of the transducer 16 in a sequential read or write process; FIG. 6 illustrates a moving trajectory of the transducer 16 in a random read or write process; and FIG. 7 illustrates a moving trajectory of transducer 16 in an idle state where a read/write operation is not performed.

FIGS. 5 through 7 illustrate movement of transducer 16 to avoid being located at the same position on disk 12 for a long time regardless of whether the HDD is in the idle state or performing a read/write operation. Accordingly, the etching or clustering effect of the lube layer coated on disk 12, which can occur when transducer 16 remains at the same position on disk 12 for a long time or when the distance transducer 16 must travel is relatively short, can be prevented.

The present invention can be applied not only to various types of disk drives including HDDs but also various types of data storage units. The present invention can be realized as a method, an apparatus, and/or a system. When the present invention is realized as software, components are embodied as code segments for executing required operations. A program or code segments can be stored in a processor readable recording medium and transmitted as computer data signals combined with a carrier using a transmission medium or a communications network. Examples of a processor readable recording medium include electronic circuits, semiconductor memory devices, read-only memory (ROM), flash memory, erasable ROM, floppy disks, optical discs, hard disks, optical fiber media, and RF networks.

As described herein, by controlling the movement of a transducer to limit its stopping time at a certain position of a disk regardless of whether a disk drive performs a read/write operation, an etching or clustering effect of a lube layer coated on the disk is prevented, thereby preventing performance degradation of the disk drive. Although the present invention has been described in connection with the embodiments of the present invention illustrated in the accompanying drawings, it is not limited thereto. It will be apparent to those skilled in the art that various substitution, modifications and changes may be thereto without departing from the scope and spirit of the invention.

What is claimed is:

1. A method of controlling movement of a transducer across the surface of a disk comprising:
   (a) after determining that a detected time has exceeded a threshold time, determining whether the transducer is located in a data zone of the disk;
   (b) if the transducer is located in the data zone of the disk based on step (a), determining whether a command accompanied by a disk access is executed; and
   (c) if the command accompanied by a disk access is executed as determined at step (b), waiting until the execution of the command accompanied by a disk access is finished and then moving the transducer to a new track determined according to a predetermined algorithm, otherwise if the command accompanied by a disk access is not executed as determined at step (b), immediately moving the transducer to a new track determined according to the predetermined algorithm.

2. The method of claim 1, wherein the command accompanied by a disk access is a data read command.

3. The method of claim 1, wherein the command accompanied by a disk access is a data write command.

4. The method of claim 1, wherein the predetermined algorithm is an algorithm to generate a random new track number.

5. The method of claim 1, wherein the predetermined algorithm is an algorithm to generate a new track number by increasing or decreasing a predetermined number of tracks from a previous seek track number associated with the disk access command.

6. The method of claim 1, further comprising:
   resetting the detected time to an initial value upon determining that the transducer is not in the data zone.

7. A disk drive comprising:
   a timer defining a detected time;
   a disk having a data zone storing information;
   a transducer configured to move across the surface of the disk to write information to or read information from the disk;
   a voice coil motor (VCM) configured to move the transducer; and
   a controller configured to determine whether the detected time exceeds a threshold time and thereafter detect whether the transducer is located in the data zone, and upon determining that the transducer is located in the data zone, the controller determines whether a command accompanied by a disk access is executed, and
   if a command accompanied by a disk access is executed, waiting unit the execution of the command accompanied by a disk access is finished and then controlling the VCM to seek a new track determined according to a predetermined algorithm, otherwise if the command accompanied by a disk access is not executed, immediately causing the VCM to seek a new track determined according to the predetermined algorithm.

8. The disk drive of claim 7, wherein said command accompanied by a disk access is a data read command.

9. The disk drive of claim 7, wherein said command accompanied by a disk access is a data write command.

10. The disk drive of claim 7, wherein the predetermined algorithm is an algorithm to generate a random new track number.

11. The disk drive of claim 7, wherein the predetermined algorithm is an algorithm to generate a new track number by increasing or decreasing a predetermined number of tracks from a previous seek track number.

12. The disk drive of claim 7, wherein the controller is further configured to reset the timer to an initial value upon determining that the transducer is not in the data zone.

13. A method of controlling movement of a transducer across the surface of a disk comprising:

upon determining that a threshold time period has been exceeded during which the transducer has been located in a data zone of the disk, determining whether or not one or more read/write commands including a current read/write command are pending for execution;

if it is determined that no read/write commands are pending for execution, immediately moving the transducer to a new track determined according to a predetermined algorithm, and if it is determined that at least the current read/write command is pending for execution, waiting until execution of the current read/write command is completed and then moving the transducer to a new track determined according to the predetermined algorithm.

14. The method of claim 13, wherein the predetermined algorithm is an algorithm to generate a random new track number.

15. The method of claim 13, wherein the predetermined algorithm is an algorithm to generate a new track number by increasing or decreasing a predetermined number of tracks from a previous seek track number.

* * * * *